Oct. 24, 1967 J. R. COPELAND ETAL 3,349,404

INTEGRATED LOBE SWITCHING ANTENNA

Filed Feb. 11, 1965 3 Sheets-Sheet 1

INVENTOR.
John R. Copeland
William J. Robertson
BY
Anthony D. Cennamo

INVENTOR.
John R. Copeland
William J. Robertson
BY
Anthony D. Cennamo

INVENTOR.
JOHN R. COPELAND
WILLIAM J. ROBERTSON
BY
Anthony D. Cennamo 3,349,404
INTEGRATED LOBE SWITCHING ANTENNA
John R. Copeland and William J. Robertson, Columbus, Ohio, assignors to The Ohio State University Research Foundation
Filed Feb. 11, 1965, Ser. No. 431,895
4 Claims. (Cl. 343—120)

The present invention relates to antennas and their associated circuitry and particularly to a new and improved integrated antenna and circuits.

The compactness required by commercial electronics is making mandatory the utmost economy of space in packaging of electronic components. This compactness must not be a sacrifice on its operability and must maintain the highest possible operating efficiencies. Similarly, compactness of design as a manufacturing cost factor and improved operation is always of importance in the developments of commercial electronic products.

Until recently, the electronic components, such as vacuum tubes, capacitors and other circuitry, were bulky and cumbersome. Despite every effort for neatness and efficiency, conventional items, such as electronic receivers and transmitters, maintained large space requirements. In addition to a loss of space, these bulky components used in the conventional receivers and transmitters lowered considerably the efficiency of the operation of the system. Further, when electronic systems in higher frequency ranges are considered, efficiency requirements become even more stringent and consequently the inefficiency of the conventional components increased.

In the last decade or so, there has been a continual development of parameters leading toward effective miniaturization. The most important being the printed circuit and, more recently, the semi-conductors, such as the transistor. These elements not only permit miniaturization, but are inexpensive, small, simple, long-lasting, and more reliable than even the most expensive prior used components.

Despite these developments in the components, per se, there continues to be the lack of unification. This is especially apparent where the actual transmitting or receiving apparatus is remoted from the antenna. Generally, even though a neat package of miniature components may be assembled, and even in the "solid state circuits," the transmission of the signals in the conventional manner from one circuit to the next tends to defeat the intended result. The problem, of course, becomes more severe as the operating frequency is increased.

In the co-pending application, Ser. No. 34,095, filed June 6, 1960, now Patent No. 3,296,536 for "Antenna System" a converter circuit is incorporated directly in the tip, or at the point of signal origin, of the antenna. With that arrangement, there is provided an antenna system that is broad banded, has instant frequency conversion, and high signal-to-noise ratio, together with other physical advantages.

In the present invention, there is employed the concept of integrating the design of an antenna with the circuitry with which it is intended to function. This combination is capable of providing improved system performance from fewer components in more compact form than the more conventional approach of separated design. In a truly integrated design of an embodiment, the antenna structure performs one or more circuit functions as well as its antenna function and, as a result, no sharp division is made which isolates antenna terminals from circuit terminals.

In an antenna and circuit integrated system, the controlled antenna-mode characteristic is altered through adjustmets of bias currents or voltages in the associated circuitry. Other benefits are better signal-to-noise ratios through the elimination of certain transmission and matching losses and in reliability and compactness, because of the reduction in number of components over that required to perform the same tasks with conventional designs.

The present invention is a further improvement over the integrated antenna circuit of the co-pending application, supra, in that the antenna itself is a unified antenna-radome. In this way, the radome is matched to its antenna system to obtain the desired system performance.

It is accordingly a principal object of the present invention to provide a new and improved integrated antenna and circuit system.

It is another object of the present invention to provide a new antenna system integrated into a radome.

Another object of the present invention is to provide an integrated antenna, radome and direction-finding circuitry.

Another object of the present invention is to provide an integrated antenna and associated circuitry having better signal-to-noise ratio and is compact and reliable in performance.

Other objects and features of the present invention will become apparent from the following detailed description when taken in conjunction with the drawings in which.

Figures 5, 5A:
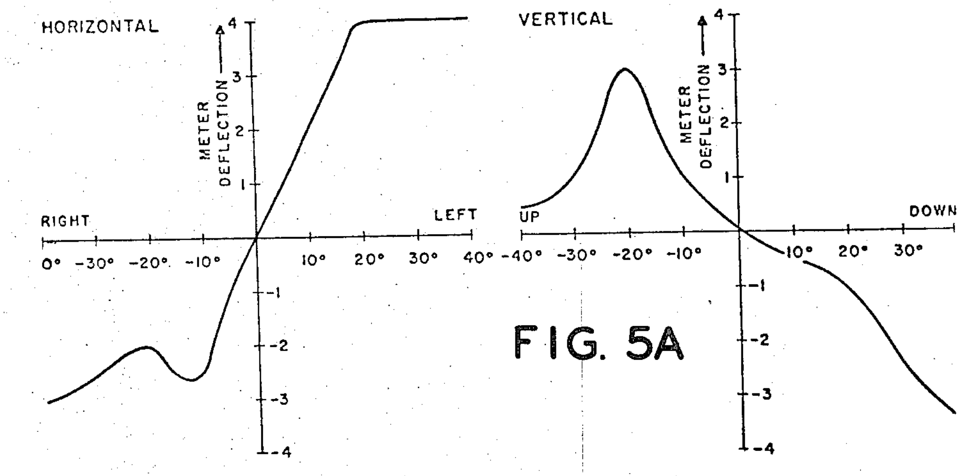
Figure 6:
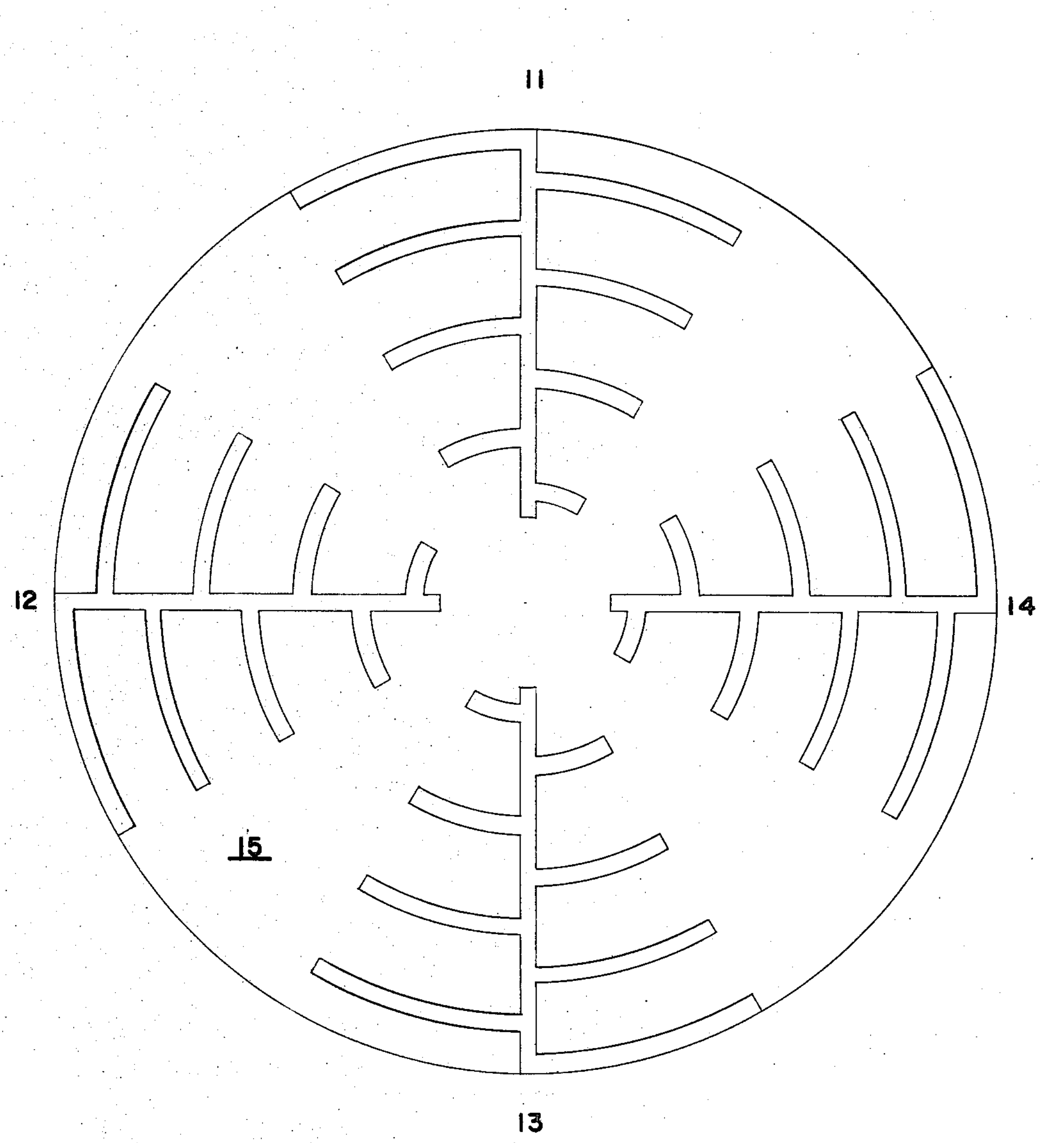

FIGURES 5 and *5a* are graphs illustrating the principal-plane angular sensitivity of the direction-finding system; and FIGURE 6 is an elevational view of a radome type of cone as viewed from the apex showing the positioning of the horizontal and vertical antenna arrays.

Figure 1:
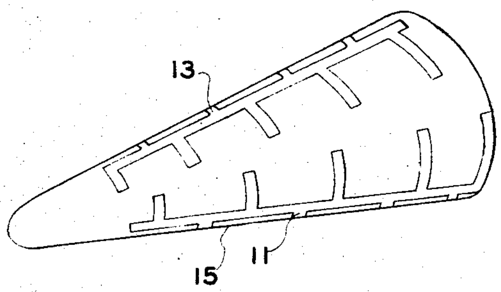
FIGURE 1 is an overall perspective view of an integrated direction-finding system.

Referring specifically to FIGURE 1, there is illustrated a lobe-switching device for homing or direction-finding using integrated switching diode circuitry and video detection. Generally, the integrated antenna-circuits 10 are layered onto the inside surfaces of a transparent glass cone 15.

The antenna 10 is a thin conductive sheet deposited in the desired antenna configuration on the inside surface of the radome 15 resulting in a single structure serving as both antenna and radome. That is, all of the radio-frequency functions are performed in the antenna-radome combination.

The cone 15 used for the integrated antenna system is, in the preferred embodiment, of transparent glass—it may be of conventional material. The cone 15 is of a size to provide adequate space for two sets, 11 and 12, and 13 and 14, of thin-sheet log-periodic dipole arrays to be arranged opposite each other on either side of the inside surface of the cone. The lobe switching antenna of a preferred embodiment (as shown in FIGURE 6) permits the vertically polarized pair, 11 and 12, on the sides to switch lobes in the horizontal plane, and the horizontally polarized pair, 13 and 14, on top and bottom to switch in the vertical plane. The conical assembly may be hung from a pivot to permit it to be swung in the vertical plane.

Figure 2:
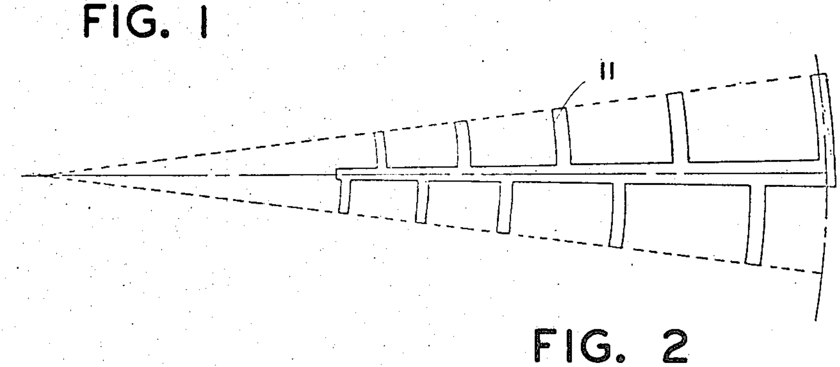
FIGURE 2 is a schematic illustration of the antenna integrated radome.

The log-periodic antenna elements are cut from adhesive-backed aluminum foil in the form 11 indicated in FIGURE 2. The element curvature was obtained by developing the inside of the cone to a flat surface. The antennas propogate in a conventional manner and are designed with known principles. The operating range of the antenna of the preferred embodiment was chosen to extend from just below 1000 mc. to above 1500 mc.—even though it was planned to operate the system in a narrow frequency range around 1000 mc. The periodicity factor $\tau$ was 0.90 in the defining equation $$l_n = \tau l_{n-1} \quad (1)$$

for the log-periodic array, where $l$ is any characteristic dimension of the design.

Figure 4:
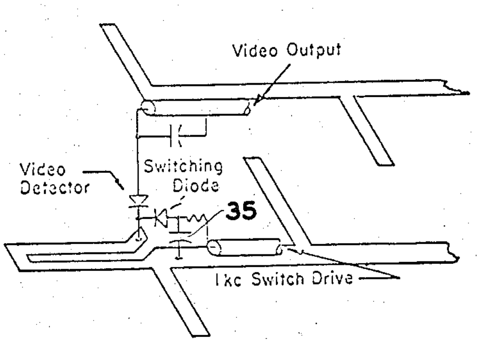
FIGURE 4 is another schematic illustration showing the antenna with the lobe-switching circuitry.

The log-periodic elements operate in diametrically-opposed pairs, 11 and 12, and 13 and 14, and lobe-switching is accomplished through an asymmetrical feed structure and a diode-switched delay line, as shown in FIGURE 4 and described hereinafter.

Figure 3:
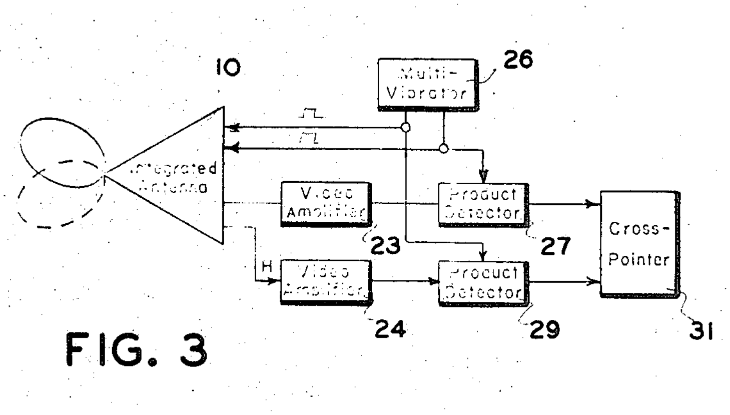
FIGURE 3 is a block schematic diagram of the circuitry of the integrated direction-finding system.

A block diagram of the circuitry for the direction-finding system of the present invention is shown in FIGURE 3. Specifically, the multivibrator 26 furnishes a square-wave pulse to the lobe-switching antennas 10, switching both the vertical lobes 11 and 12 and the horizontal lobes 13 and 14, simultaneously. The modulated video thus derived from the two channels is amplified in video amplifiers 23 and 24, synchronously detected in detectors 27 and 29, and displayed on the two needles of a cross-pointer instrument 31 similar to that used in an Instrument Landing System glide-slope and localizer presentation.

The video detectors incorporated into the feed assemblies are two-stage video amplifiers of conventional design. The first stage is designed for low noise figure, and the overall gain is sufficient to give usable meter deflection on the lowest video voltage expected from the antennas. Centering controls are provided to correct any residual boresight error in the system.

The diode-switched delay line shown in FIGURE 4 is adjusted for a delay equal to twice the amount occurring in the asymmetrical feed. This causes a beam squint equal and opposite to the one provided by the basic feed structure. Thus, by alternately open-circuiting and short-circuiting the delay line, the pattern could be made to switch between the two states of equal positively and negatively squinted positions. The diode switch used for electronic lobe-switching was a commercial silicon planar diode with a small shunt inductance to resonate out the stray junction capacity on reverse bias. A bypass capacitor 35 with coiled leads was used for this inductance because of the necessity of providing a DC block for diode bias.

FIGURE 5 shows the horizontal and vertical principal-plane angular calibration curves taken with both manual gain controls set to maximum and the incident power level adjusted to produce full-scale deflection of the indicator without saturation. The horizontal sensitivity measured in this way is approximately 5° per division, and the vertical sensitivity is approximately 10° per division. The two sensitivities could be made equal, if desired, by reducing the gain in the horizontal channel. A few irregularities occur off-axis, which are due, in part, to reflections from the surrounding steel support rods and, in part to the relatively small squint angles chosen for the lobe-switching patterns.

The angular coverage of the direction-finding system is approximately cone-shaped, covering about ∓40° from the nose-on symmetry axis. Useful qualitative information regarding the direction of a source (i.e., up-down, right-left) is available over a somewhat larger range, but the high-angle readings are multiple-valued and tend to be ambiguous.

The best frequency of operation is 1000 mc., where the boresight error is zero. For frequencies slightly different from 1000 mc., the centering controls must be adjusted to compensate for the boresight error in the system. The amount of this adjustment also is dependent upon signal power level, as is the angular sensitivity, owing to the lack of AGC.

A circularly-polarized signal source is recommended for use with this system because the horizontal channel is predominantly vertically polarized, and the vertical channel is predominantly horizontally polarized. The test antenna used for these measurements was a four-turn, 1000 mc. helix, wound with a 12.5° pitch angle.

The power sensitivity of the system is adequate to produce full-scale deflection from a 5-milliwatt unmodulated 1000 mc. signal into the four-turn helix placed approximately 1 meter from the cone tip.

The system provides a good demonstration of the sophisticated performance that can be obtained from a compact system by using integrated designs. All RF circuit functions (beam-forming, lobe-switching, and video detection) are accomplished in the antenna itself, and virtually all of the RF components are or could be deposited in thin film form on the surface of the radome.

The amount of asymmetry required in the feed structure for a given amount of beam squint may be calculated from single array theory with two assumptions: the two halves of the antenna radiate from point sources located in the resonant region of the log-periodic array and that the phase of one point source is delayed relative to the other by the difference in path length through the asymmetrical feed.

Since the cone circumference is approximately one wavelength in the resonant region of the log-periodic antennas, the separation between the two equivalent point sources is $\lambda/\pi$ at any frequency. It follows immediately that the differential path length in the asymmetrical feed is $$d = \frac{\lambda}{\pi} \sin \theta \quad (2)$$

where $\theta$ is the angle of beam squint away from the symmetry axis. For $\lambda_0 = 30$ cm. and $\theta_0 = \pi/8$, $d$ must be 0.382 $(\lambda_0/\pi)$, or 3.65 cm.

It is convenient to truncate the small end of the log-periodic element at a position where the diameter of the cone is approximately equal to $d$. Thus, the asymmetrical feed consists of a straight wire connection between the two sides of the cone. This occurs near the tenth element in the chosen log-periodic design. Actually, $$l_{10} = 0.388 l_1 \quad (3)$$

in the logarithmic coefficients. Thus, truncation of the design at the tenth element provides space for both the asymmetrical feed and the video detector diode.

Since the length $d$ was chosen to give a specified squint angle at 1000 mc., the frequency dependence of squint angle may be obtained by differentiating the appropriate expression for squint angle $$\lambda \sin \theta_m = \pi d = \lambda_0 \sin \theta_0 \quad (4)$$

where $\theta_m$ is the squint angle at wavelength, and $\theta_0$ is the chosen squint angle at $\lambda_0 = 30$ cm.

It follows that $$\frac{d\theta m}{df} = \frac{\sin \theta_0}{\sqrt{1 - \left[\frac{f}{f_0} \sin \theta_0\right]^2}} \quad (5)$$

For the constants chosen here, the frequency dependence of squint angle is about 0.02375°/mc. at 1000 mc., which is small enough to be negligible over the frequency band of interest.

What is claimed is:

1. An integrated antenna comprising an antenna supporting structure, a first pair of antennas fixedly positioned in said structure opposite each other in a cross direction from said first pair, a lobe switching circuit physically supported and electrically coupled between said pair of antennas, a feed source of electro-magnetic energy, and a delay line also positioned in said structure to be electrically coupled directly to said circuit and said feed; said delay line comprising a diode-switched delay line, means for adjusting said delay to twice that of said feed thereby causing a beam squint equal and opposite to that provided by said feed, and means to alternately open-circuit and short-circuit said delay line for switching between the two states of equal positively and negatively squinted positions.

2. An antenna structure as set forth in claim 1 wherein said frequency of operation is optimized in the order of 1000 mc.

3. An integrated antenna comprising a contoured closed antenna supporting structure, a first pair of log-periodic dipole arrays positioned in said structure opposite each other, a second pair of log-periodic dipole arrays, means for positioning said arrays in said structure opposite each other and in cross direction to said first pair, said arrays comprising a thin conductive sheet, and means for adhering said thin conductive sheet to the contour of said structure; a beam forming circuit, a detector circuit, and an output circuit physically positioned between said antennas in said structure and electrically coupled to said arrays, an electromagnetic feed source coupling energy from said circuits, and a lobe switching circuit also connected to said other circuits for alternately switching the energy from said antennas to said feed source; and a delay line also positioned in said structure to be electrically coupled directly to said circuit and said feed, said delay line comprising a diode-switched delay line, means for adjusting said delay to twice that of said feed thereby causing a beam squint equal and opposite to that provided by said feed, and means to alternately open-circuit and short-circuit said delay line for switching between the two states of equal positively and negatively squinted positions.

4. An integrated antenna as set forth in claim 3 wherein said contoured supporting structure is truncated, said arrays adhered to said structure having the front small end thereof in said truncated section, and wherein said feed is an asymmetrical feed comprising a straight wire connecting said arrays.

References Cited

UNITED STATES PATENTS

| | | | |
|---|---|---|---|
| 3,061,831 | 10/1962 | Fromm | 343—120 X |
| 3,110,030 | 11/1963 | Cole | 343—792.5 |
| 3,246,245 | 4/1966 | Turner | 343—895 X |

RODNEY D. BENNETT, *Primary Examiner.*

CHESTER L. JUSTUS, *Examiner.*

D. C. KAUFMAN, *Assistant Examiner.*